United States Patent [19]

He et al.

[11] Patent Number: 5,824,144
[45] Date of Patent: Oct. 20, 1998

[54] POWDER COATING COMPOSITION AND METHOD

[75] Inventors: Mingbo He, St. Louis Park, Minn.; Michael T. Venturini, Yorktown Heights, N.Y.

[73] Assignee: Engelhard Corporation, Iselin, N.J.

[21] Appl. No.: 827,783

[22] Filed: Apr. 11, 1997

[51] Int. Cl.$^6$ .................................................. C09C 1/62
[52] U.S. Cl. .................... 106/403; 106/404; 106/415; 106/417; 106/418
[58] Field of Search ................................ 106/415, 417, 106/418, 403, 404

[56] References Cited

U.S. PATENT DOCUMENTS

| | | | |
|---|---|---|---|
| 3,897,586 | 7/1975 | Coker | 428/403 |
| 3,980,607 | 9/1976 | Johannes | 523/440 |
| 4,116,628 | 9/1978 | Hesse et al. | 427/154 |
| 4,205,997 | 6/1980 | Hesse et al. | 106/418 |
| 4,750,940 | 6/1988 | Higashi | 524/439 |
| 4,755,229 | 7/1988 | Armanini | 106/413 |
| 4,814,020 | 3/1989 | Kieser et al. | 106/499 |
| 5,228,912 | 7/1993 | Herget et al. | 106/505 |
| 5,268,197 | 12/1993 | Pons et al. | 427/221 |
| 5,304,395 | 4/1994 | Pons et al. | 427/213.3 |
| 5,378,275 | 1/1995 | Shiraga et al. | 106/417 |
| 5,618,342 | 4/1997 | Herget et al. | 106/416 |

*Primary Examiner*—Mark L. Bell
*Assistant Examiner*—Scott L. Hertzog
*Attorney, Agent, or Firm*—Ostrolenk, Faber, Gerb & Soffen, LLP

[57] ABSTRACT

A pigment in the form of metallic platelets is mixed with a sticky viscous liquid. The resulting pigment can be combined with a powdery film-forming polymer to produce a film-forming composition which can be applied by electrostatic coating.

24 Claims, No Drawings

POWDER COATING COMPOSITION AND METHOD

BACKGROUND OF THE INVENTION

The application of color coatings on various substrates by an electrostatic coating process is well known. For example, many automotive finishes are applied by such a method. The composition applied by this process is an electrically chargeable powder mixture of a film forming polymer and a pigment or pigments of the desired color. The preparation of such powder coating compositions for application by powder coating spraying applicators has presented a problem in the past with platey pigments.

Pigments which are composed of platelets of a metallic material rely on their lamellar structure for their maximum appearance effect. Examples of such platelets include metallic flakes such as aluminum flakes, bronze flakes, and stainless steel flakes and natural or synthetic pearlescent pigments exemplified by, for instance, natural pearlescence or a metal oxide-coated mica such as titanium dioxide-coated mica, reduced titanium dioxide-coated mica and iron oxide-coated mica, and titanium and/or iron coated glass flakes, and iron coated aluminum flakes. In the course of the manufacture of powder coating compositions containing such metallic or pearlescent pigments, the lamellar structure is destroyed during the extrusion or grinding processes which are used. As a result, the resulting finish exhibits a reduced luster effect.

In order to avoid the foregoing problem, the industry has dry blended the pigments and polymer powder, i.e., the powder carrier is mechanically blended with the pigments. Unfortunately, the pigment and powder coating particles usually develop a different charge magnitude so that there is a color shift when the powder coating composition is electrostatically sprayed on a substrate. In addition, the pigments tend to separate from the powder in the volume of powder spray composition which does not attach to the substrate and is recovered, which makes the recovered material difficult to reuse.

A bonding process was developed to overcome the problems encountered as a result of the dry blending process. In the bonding process, the powder base and pigment are mixed together and then heated to a temperature sufficient to soften the surface of the powder particles so that the pigment particles can bind to the surface of the powder particles. The process works well for corona electrostatic charging and it alleviates the problems with reusing the powder overspray. Unfortunately, it also leaves two distinctly different surfaces in the final mixture, namely the powder surface and the "outside" surface of the laminar pigment that is attached to the powder. It does not work well for tribo electrostatic charging. This process also requires additional processing steps to prepare the powder coating composition and also it must be especially adapted to each selected combination of pigment and powder base.

U.S. Pat. No. 5,378,275 discloses a mica pigment-containing water base paint composition which is the combination of a water soluble or water dispersable film forming polymer and a mica-containing pigment. The mica pigment can be mica flakes or metal oxide-coated mica flakes which have been uniformly coated with a melamine resin by slurring and then volatilizing the organic solvent present. The melamine resin must be used in an amount of at least equal weight to the mica flakes or else satisfactory results in terms of dispersability, water resistance and adhesion cannot be achieved.

U.S. Pat. Nos. 4,116,628 and 4,205,997 disclose powdery pearlescent pigment compositions which are coated with a solid polymer other than tacky or sticky polymers, in order to protect the pigment prior to use. The polymer content can be about 1–25% by weight and the product can be produced by various methods including forming a suspension followed by spray drying. The coating causes the pigment to lose its luster, i.e., its pearlescence, but the luster can be restored by removing the coating prior to incorporation into a coating composition.

A method of coating inorganic and organic particles such as pigment particles and colorant particles with a plastic dispersion is disclosed in U.S. Pat. No. 5,268,197. The dispersion is that of a polymer based on a vinyl monomer, a phosphorous-containing compound and certain (meth) acrylates, itaconates, fumerates or maleates. The coated particles can be formed with a spray drying step and the resulting product can be mixed with plastics without forming agglomerates.

A powder coating composition is disclosed in U.S. Pat. No. 3,980,607 in which synthetic resins, hardeners and pigments such as metals, metal alloys and mica for coatings with a metallic appearance are prepared by a process in which the individual components are mixed in a finely divided state under an atmosphere of a protective gas and the mixture is plasticized with homogenization at a temperature at which the viscosity of the synthetic resin is higher than the drop viscosity. The hardenable synthetic resin can be a melamine resin and the resulting powder can be electrostatically sprayed.

It is the object of the present invention to provide a new process for preparing pigments which can be incorporated into powder coating compositions suitable for corona and tribo electrostatic applications and to the pigments and powder coating compositions thus produced. This and other objects of the invention will become apparent to those skilled in the art from the following detailed description.

SUMMARY OF THE INVENTION

This invention relates to a metal-containing platelet pigment suitable for a powder coating composition and to the powder coating compositions including such pigments. More particularly, the metal platelets are provided with a viscous surface layer of polymer or other sticky liquid material. When this treated pigment is blended with powder coating compositions, the powder attaches to the surface of the pigment thereby minimizing color separation. The pigment is also encapsulated by the powder to thereby present a single surface. The coating also results in a better charge on those pigment particles which do not become attached to the powder materials, i.e., they accept a charge which is closer to the charge on the powder coating particle surfaces than the uncoated pigment particles.

DESCRIPTION OF THE INVENTION

A lamellar pigment, that is a platelet-like pigment, is provided with a viscous surface layer of material pursuant to the present invention. The platelets can be made of a reflective metal such as aluminum flakes, bronze flakes, stainless steel flakes or any natural or synthetic pearlescent pigment. Natural pearlescent pigments include natural pearlescence and synthetic pigments include metal oxide-coated mica pigments, titanium and/or iron coated glass flakes, iron coated aluminum flakes and reduced titanium coated micas. Commercially, the synthetic pigments encountered most often are the titanium dioxide-coated micas and iron oxide-coated micas. Any of these lamellar pigments can be treated in accordance with the present invention.

The lamellar pigments are provided with a viscous surface coating of sticky material, which is preferably a polymer or monomer. Any liquid material can be employed in the present invention which provides a coating which is viscous, i.e., tacky or sticky, at ambient temperature, stable at ambient or storage (if different) temperature and also do not substantially adversely affect the appearance of the pigment under the conditions of use. The latter requirement is a function of the particular pigment being coated, the characteristics of the material itself, the degree to which it is cured, the amount used, etc. Materials which provide a dry film, such as alkyds, or react with oxygen, may be used. Selection of the appropriate material can be accomplished by conducting one or more routine screening experiments.

Suitable materials include, but are not limited to, acrylic resins such as that sold under the trademark Acryloid WR-97, materials characterized as reactive diluents such as glycidyl esters of neodecanoic acid, for instance that sold under the trademark Glydexx N-10, polyester resins, high boiling petroleum distillates and similar solvents such as that sold under the trademarks Magiesol 52, Magiesol 500 and Exxprint 795, polyisocyanate resins such as that sold under the trademark Desmodur N-75, plasticizers such as dioctyl phthalate, dibutyl phthalate, di-isodecyl phthalate and di-isononyl phthalate, dispersing agents such as that sold under the trade nome Solsperse 28000 and the non-ionic silane agent sold under the name Silquest A-1230 and the like.

The preferred materials for use as the surface coating in the present invention are the commercially available melamine resins. These melamine resins are, in general, alkoxy methylol melamines such as methoxy methylol melamine, n-butoxy methylol melamine, isobutoxy methylol melamine, methoxy butoxy methylol melamine, and the like, as well as their condensation products. Examples of commercially available products include those sold under the trademarks Cymel 301, 303, 325 and 327.

The material, such as the melamine or the like, is generally employed in the form of a slurry or solution in either water or an organic vehicle. It is preferred to employ water based slurries or solutions because they are environmentally friendly, generally safe to workers and generally available commercially at a relatively low cost. Nevertheless, organic based vehicles such as aromatic compounds including toluene and xylene, alcohols including ethanol, isopropanol and butanol, ketones such as acetone, methyl isobutyl ketone and methyl ethyl ketone, esters including ethyl acetate and ethyl butyrate, petroleum compounds such as petroleum naphtha and mineral spirits, as well as the cellosolve, carbitol and the like materials can also be used.

The coated lamellar pigments are prepared by simply dispersing the solid lamellar material in the solution or slurry of the viscous material to thereby form a slurry. In general, the slurry will contain about 0.1–10% material and preferably about 0.5–5_% material. In general, the lamellar pigment will constitute about 5–75 wt %, preferably about 20–35 wt % of the pigment-containing slurry weight. It is also preferred to agitate the mixture to a degree sufficient so that all of the surfaces of the pigment are exposed. After the agitation is continued for a suitable length of time, which generally is about 0.2–5 hours and preferably about 0.5–2 hours, the coated pigments are recovered. Recovery can be by spray drying the suspension using any conventional spray drying procedure as long as the resulting coating remains viscous and the pigment particles remain separated.

Alternatively, the viscous liquid can be distributed onto the pigment surface by means of mechanical mixing. Special care should be taken to utilize sufficient mixing to distribute the sticky liquid while not damaging the plate-like structure of the pigment. A ribbon blender with high intensity choppers is preferred.

The resulting coated pigment can then be incorporated into a conventional powder coating composition for electrostatic application by dry blending. When the coated pigments are mixed with the powder coating composition by tumble blending, for example, the powder particles become attached to the pigment particles through the viscous layer. In addition, the pigment platelet's surface coating tends to realize a surface charge which is similar to the charge of the powder coating particle surfaces even if attachment does not occur.

In order to further illustrate the invention, various examples are set forth below. In these, as throughout the rest of this specification and claims, all parts and percentages are by weight and all temperatures in degrees Centigrade unless otherwise indicated.

EXAMPLE 1

A mixing vessel was filled with 750 parts of deionized water. A water soluble, 100% solid melamine resin, Cymel 301, was added to the water dropwise with agitation in a total amount of 5 parts and then the mixing was continued using an air propeller for 5 minutes. Into the resulting solution was added 250 parts of a commercially available titanium dioxide-coated mica and the mixing was continued with the air propeller for an additional 10 minutes. Thereafter the pigment slurry which resulted was spray dried using an inlet temperature of 275° C. and an outlet temperature of 85° C.

The treated pigment was incorporated at a 5% concentration into a commercial polyester powder coating composition (Corvel Clear No. 23-9030 by Morton International) by means of tumble mixing. Thereafter, the mixture was sprayed on a metal substrate panel using a corona charge gun at 75 kv voltage and the resulting substrate was baked at 400° F. for 10 minutes. For comparison purposes, the foregoing procedure was repeated employing uncoated titanium dioxide-coated mica. Comparison of the two coated substrates showed that the film formed with the coated pigment exhibited better luster, which indicated there was more pigment on the substrate panel, and better appearance.

The treated pigment was also incorporated into the polyester powder coating composition by tumble mixing at a 10% concentration. It was then sprayed using a corona gun at 75 kv onto a metal panel. The treated sample sprayed evenly and smoothly, producing a panel free of defects. For comparison purposes, the same pigment without the viscous treatment was incorporated at 10% into the same polyester powder coating composition in the same manner and sprayed in the same way. The resulting panel had an uneven appearance with several defects.

In addition, the chargeability, that is the charge-to-mass ratio, of the resulting powder/plate-like pigment mixture was measured using a Kleber gun. In this instrument, the power coating is conveyed through a Teflon tube and the charge transferred from the powder to the Teflon is measured. The polyester powder composition per se (i.e., without pigment) had a "charge" of 0.60 $\mu$ coulombs/gram. A mixture of the polyester and 5% of the untreated pigment had a charge of 0.35 $\mu$c/g while the mixture containing the treated pigment had a charge of 0.67 $\mu$c/g. The untreated pearlescent pigment had a charge-to-mass ratio of 0.82 μc/g while the treated pigment had a ratio of 1.3 μc/g. The similarity of the charge of the unpigmented polyester (0.60) and the mixture containing the treated pigment (0.67) is indicative of the pigment being encapsulated by the polymer so that there is essentially only one surface type being presented in the powder coating composition.

EXAMPLE 2

Example 1 is repeated except that an iron oxide-coated mica pearlescent pigment is substituted for the titanium dioxide-coated mica pigment.

EXAMPLE 3

A mixing vessel was filled with 600 parts deionized water and the pH adjusted to 8.0 using dilute ammonium hydroxide. A water reducible, thermosetting acrylic polymer (Acryloid WR-97) was added dropwise with agitation in a total amount of 5 parts and mixing was continued for ten minutes. Then 350 parts of a commercially available titanium dioxide coated mica pearlescent pigment (Exterior Mearlin Sparkle, Engelhard Corp.) was added to the resulting mixture and agitated for one hour. The pigment slurry was sprayed dried using an inlet temperature of 275° C. and an outlet temperature of 95° C.

The treated pigment can be incorporated into a powder coating composition and applied using the procedures described, inter alia, in Example 1.

EXAMPLE 4

Example 3 was repeated except that the pigment treated was a chromium hydroxide treated titanium dioxide-coated mica.

EXAMPLE 5

Example 3 was repeated except that the pigment coated was a chrome-free exterior grade titanium dioxide-coated mica pearlescent pigment.

EXAMPLE 6

An eight liter V-shaped tumble mixer fitted with a high-speed rotating chopper blade was charged with 2,000 parts of a commercially available titanium dioxide-coated mica pigment (Magnapearl 1100, Engelhard Corp.) Atomized onto the pigment was 40 parts of a 1:1 mixture of melamine resin:phthalate ester (Cymel 324:Jayflex DINP) and the combination mixed for 30 minutes as the chopper blade rotated.

The treated pigment can be incorporated into a powder coating composition and applied using the procedures described, inter alia, in Example 1.

EXAMPLE 7

1,000 parts of a commercially available titanium dioxide-coated mica (Exterior Mearlin Super Sparkle, Engelhard Corp.) was introduced into a four liter high intensity batch mixer. With the blender running at 3,500 rpm, 20 parts of a 2:1 mixture of melamine resin (Cymel 301):butyl carbitol was atomized into the mixing chamber which was then allowed to run for an additional four minutes and the coated pigment recovered.

The treated pigment can be incorporated into a powder coating composition and applied using the procedures described, inter alia, in Example 1.

EXAMPLE 8

Example 1 is repeated except that aluminum flakes are substituted for the exterior titanium dioxide-coated mica pigment.

EXAMPLE 9

A mixing vessel is filled with 560 parts of mineral spirits and 240 parts (100% pigment basis) of iron oxide-coated aluminum flakes (Paliochrome L-2020, BASF). The resultant slurry is agitated for 30 minutes and then 6 parts of 100% solid melamine resin (Cymel 303) is added dropwise. The mixture is agitated for an additional thirty minutes, spray dried and the pigment-melamine product collected.

The treated pigment can be incorporated into a powder coating composition and applied using the procedures described, inter alia, in Example 1.

EXAMPLE 10

One thousand parts of reduced titanium oxide coated-mica (Paliocrom L-6000) was introduced into a 4 liter high intensity batch mixer. With the mixer running at 3,500 rpm, 20 parts of a 1:1 mixture of melamine resin and butyl carbitol was added dropwise. Mixing was continued for another 10 minutes.

The treated pigment can be incorporated into a powder coating composition and applied using the procedures described, inter alia, in Example 1.

EXAMPLE 11

One thousand parts of exterior grade titanium dioxide coated-mica (Engelhard Corp.) was introduced into a 4 liter high intensity batch mixer. With the mixer running at 3,000 rpm, 20 parts of a 1:1 mixture of non-ionic silane dispersing agent (Silquest A-1230) and butyl carbitol was added dropwise. Mixing was continued for another 5 minutes.

The treated pigment can be incorporated into a powder coating composition and applied using the procedures described, inter alia, in Example 1.

Various changes and modifications can be made in the products and process of the present invention without departing from the spirit and scope thereof. The various embodiments which have been illustrated in this specification were intended to exemplify the invention but were not intended to limit it.

What is claimed is:

1. A lamellar metal-containing pigment having a sticky surface layer thereon.

2. The pigment of claim 1 in which the sticky layer comprises a polymer.

3. The pigment of claim 1 in which the stickly layer comprises a melamine.

4. The pigment of claim 3 in which the lamellar metal-containing pigment comprises a metal flake or oxide coated-metal flake pigment.

5. The pigment of claim 3 in which the lamellar metal-containing pigment comprises a metal oxide-coated mica pigment.

6. The pigment of claim 5 in which the lamellar metal-containing pigment comprises a titanium or iron oxide-coated mica pigment.

7. The pigment of claim 1 in which the lamellar metal-containing pigment comprises a metal flake pigment.

8. The pigment of claim 1 in which the lamellar metal-containing pigment comprises a metal oxide-coated mica pigment.

9. The pigment of claim 8 in which the lamellar metal-containing pigment comprises a titanium or iron oxide-coated mica pigment.

10. The pigment of claim 1 in which the sticky layer comprises a solvent and a material selected from the group consisting of a polymer, melamine, plasticizer, reactive diluent and mixtures thereof.

11. A powder coating composition comprising a mixture of particulate resin carrier and particulate pigment in which the pigment is the pigment of claim 1.

12. A powder coating composition comprising a mixture of particulate resin carrier and particulate pigment in which the pigment is the pigment of claim 2.

13. A powder coating composition comprising a mixture of particulate resin carrier and particulate pigment in which the pigment is the pigment of claim 3.

14. A powder coating composition comprising a mixture of particulate resin carrier and particulate pigment in which the pigment is the pigment of claim 4.

15. A powder coating composition comprising a mixture of particulate resin carrier and particulate pigment in which the pigment is the pigment of claim 5.

16. A method of preparing a particulate pigment for powder coating compositions comprising combining a lamellar metal-containing pigment with a sticky surface layer liquid material and recovering the resulting combination to form said sticky surface layer on said pigment.

17. The method of claim 16 in which the combining is by dry blending.

18. The method of claim 16 in which the sticky material is a polymer and the recovery is by spray drying.

19. The method of claim 17 in which the sticky polymer is a melamine and the recovery is by spray drying.

20. The method of claim 19 in which the lamellar metal-containing pigment comprises a metal flake pigment.

21. The method of claim 19 in which the lamellar metal-containing pigment comprises a metal oxide-coated mica pigment.

22. The method of claim 21 in which the lamellar metal-containing pigment comprises a titanium or iron oxide-coated mica pigment.

23. The method of claim 16 in which the lamellar metal-containing pigment comprises a metal flake mica pigment.

24. The method of claim 16 in which the lamellar metal-containing pigment comprises a metal oxide-coated mica pigment.

* * * * *